United States Patent [19]

Swix et al.

[11] Patent Number: 4,841,291
[45] Date of Patent: Jun. 20, 1989

[54] INTERACTIVE ANIMATION OF GRAPHICS OBJECTS

[75] Inventors: Scott R. Swix, Atlanta; Leroy A. Krueger, Marietta, both of Ga.

[73] Assignee: International Business Machines Corp., Armonk, N.Y.

[21] Appl. No.: 98,653

[22] Filed: Sep. 21, 1987

[51] Int. Cl.⁴ .............................................. G09G 1/16
[52] U.S. Cl. ................................... 340/725; 340/710; 340/724; 352/50
[58] Field of Search ............... 340/706, 709, 710, 723, 340/725, 745, 747; 434/43, 44; 364/518, 519, 520, 521; 352/39, 50

[56] References Cited

U.S. PATENT DOCUMENTS

| | | | |
|---|---|---|---|
| 4,116,444 | 9/1978 | Mayer et al. | 340/745 |
| 4,435,778 | 3/1984 | Cason et al. | 340/709 |
| 4,471,348 | 9/1984 | London et al. | 340/722 |
| 4,588,987 | 5/1986 | Stephens | 340/715 |
| 4,600,919 | 7/1986 | Stern | 340/725 |
| 4,661,810 | 4/1987 | Himelstein et al. | 340/706 |
| 4,686,522 | 8/1987 | Hernandez et al. | 340/709 |
| 4,689,616 | 8/1987 | Goude et al. | 340/725 |
| 4,764,763 | 8/1988 | Wickstead et al. | 340/725 |

OTHER PUBLICATIONS

"Superpaint . . . the Digital Animator", Richard G. Shoup, May, 1979, pp. 150–156, Datamation.

Primary Examiner—John W. Caldwell, Sr.
Assistant Examiner—Mahmoud Fakahiyar
Attorney, Agent, or Firm—C. Lamont Whitham; Michael E. Whitham

[57] ABSTRACT

A technique is described for animating graphics objects (sprites) on a display. The display manager allows a user to select a sprite from the display or from a sprite table. Then the user selects the operation to perform on the sprite. Enabled operations include hiding the sprite, showing the sprite, redefining the sprite, placing the sprite or moving the sprite. The move operation allows the user to make the sprite the current cursor character and move it around the display under the control of the mouse. Any of the operations may be performed on the selected sprite. The operations are recorded for the user to later playback. Additionally, the user can select other sprites and perform additional operations on them. In this way, the user can interactively create an animated display consisting of multiple sprites. As the user creates the various sprite operations, he or she can play them back at any time to see how they appear and edit the operations to tailor them to the user's needs.

9 Claims, 6 Drawing Sheets

FIG. 7

INTERACTIVE ANIMATION OF GRAPHICS OBJECTS

BACKGROUND OF THE INVENTION

1. Field of the Invention

This invention generally relates to a computer display system, and more particularly, the invention is directed to a display system which provides the tools to manage the animation of graphics objects (sprites) on a display. An interface is provided which allows an operator to interactively define sequences of operations to be performed on sprites using a cursor placement device such as a mouse. These operations include moving the sprites on a specified path over the display, hiding the sprite, placing the sprite on the display, or redefining the sprite. Each operation is recorded for later playback. In this way a user can interactively create an imaginative, animated display, such as a man walking across the display.

2. Description Of The Prior Art

Video games are an accepted form of entertainment for kids of all ages. The games consist of complex graphics objects moving across the display in real time. Some of the objects may be under the control of a user manipulated joystick, while others follow predefined paths and actions that are hardcoded into the supporting hardware and software. The software that supports the video games consists of explicit instructions that a programmer must code to enable the logic of the game. There is no provision to allow the user to change the game and enable new paths for the movement of the graphics objects.

In industrial automation environments, graphic tools were created to allow a user to depict events that transpired in plant environments on a graphics display. The interactive display of graphic information and depiction of animated sequences of events was in response to sensor points in the industrial environment. An example of such a system can be found in U.S. Pat. No. 4,588,987, to Stephens, issued May 13, 1986 and U.S. Pat. No. 4,471,348, to London et al., issued Sept. 11, 1984. These systems lack the capability of interactively defining a path for a graphics object to travel on a display and the actions that will be performed on the graphics objects as they move across the display.

SUMMARY OF THE INVENTION

It is therefore an object of this invention to provide a display interface which allows an operator to interactively define sequences of operations to be performed on sprites using a cursor placement device such as a mouse.

It is a further object of the invention to allow a user to interactively define a path that the graphics objects will traverse on the display.

It is another object of the invention to define multiple sequences of operations to be performed on sprites over a defined path of a display.

It is a further object of the invention to playback the sequences of operations and display the animation sequences that the user has created.

According to the invention, these objects are accomplished by providing an interactive display manager. The display manager allows a user to select a sprite from the display or from a sprite table. Then the user selects the operation to perform on the sprite. Enabled operations include hiding the sprite, showing the sprite, redefining the sprite, placing the sprite, moving the sprite, or changing the sprite transparent color. The move operation allows the user to make the sprite the current cursor character and move it around the display under the control of the mouse. Any of the operations may be performed on the selected sprite. The operations are recorded for the user to later playback. Additionally, the user can select other sprites and perform additional operations on them. In this way, the user can interactively create an animated display consisting of multiple sprites. As the user creates the various sprite operations, he or she can play them back at any time to see how they appear and edit the operations to tailor them to the user's needs.

The sprite animation capabilities of this invention are designed to be embedded in a general graphics editing program that provides access to any generic screen artwork package to produce the screens on which the sprites will move over, and which can be used to generate the images to be used for the sprites. The editor also provides the capability to edit, save and load animation command lists produced by the animation editor. This editor represents a component of what is called the "autoring system", wherein a presentation using the sprite animation is created. A separate "presentation system" utilizing the command lists generated in the authoring system and the EXECUTE command function is used to replay the animation sequences without the overhead of the animation editor. The EXECUTE command function would be embedded into the game, simulation, teaching aid or the like.

BRIEF DESCRIPTION OF THE DRAWINGS

The foregoing and other objects, aspects and advantages of the invention will be better understood from the following detailed description of the preferred embodiment of the invention with reference to the accompanying drawings, in which.

DESCRIPTION OF THE PREFERRED EMBODIMENT OF THE INVENTION

The following disclosure describes a method for the improved management of the animation of graphics objects (sprites) on a display. The disclosed invention is described using a Personal Computer (PC); however, one of ordinary skill in the art will recognize that any microprocessor that has the capability of displaying graphic information on a display could be substituted for the PC.

Figure 1:
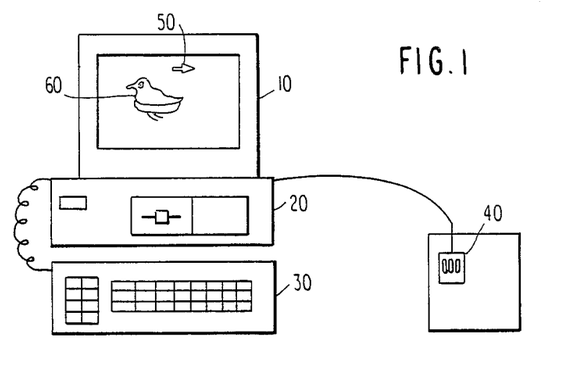
FIG. 1 is an illustration of a typical hardware system environment in which the graphics animation system according to the invention executes.

Referring now to the drawings, and more particularly to FIG. 1, there is illustrated a typical hardware system environment in which the graphics animation manager executes. A graphics display 10 is attached to a Personal Computer 20 which includes an attached keyboard 30 and cursor placement device such as a mouse 40. The mouse 40 could be replaced with a joystick, touch screen or other pointing device and is an optional supplement to the cursor keys on the keyboard 30. The cursor keys on the keyboard 30 and/or mouse 40 are used to position the cursor 50. Multiple sprites, such as the sprite 60, can be displayed on the graphics display 10.

Figure 2:
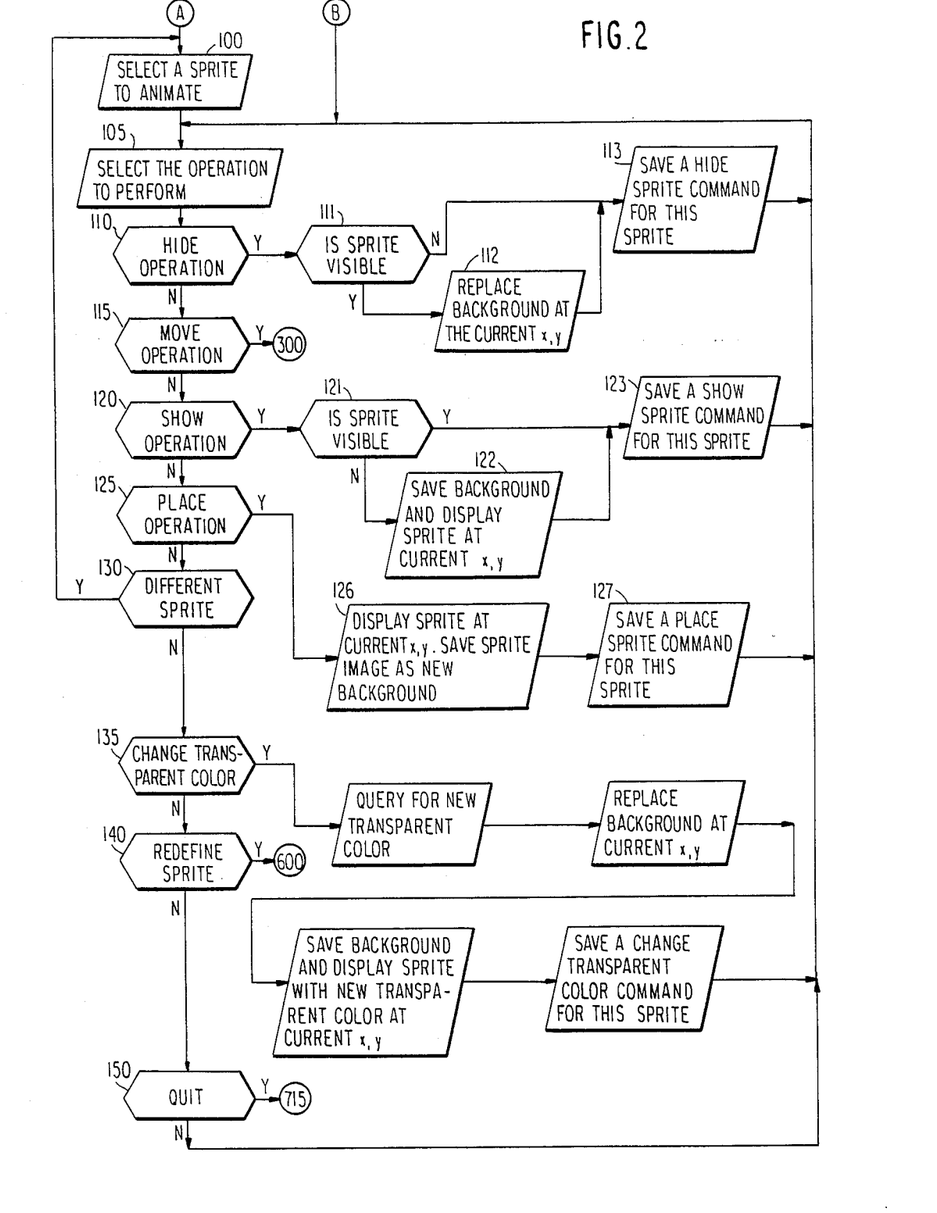
FIG. 2 is the detailed flowchart of the sprite control program according to the invention.

A detailed flowchart of the sprite control program according to the invention is provided in FIG. 2. The creation of an animated display begins when the function is chosen from a menu selection. The selection of the function causes the menu to be removed from the display 10 and the user is prompted to select the sprite to animate at 100. Then the user selects the operation to perform at function block 105. The selection of the operation is facilitated by moving the cursor through a menu of operations and selecting an operation by pressing a button on the mouse 40. Based on the operation, different logic is then entered as indicated by the sequence of decision blocks 110, 115, 120, 125, 130, 135, 140, and 150.

If the selected operation is the HIDE operation as detected in decision block 110, the sprite is to be rendered invisible. A test is first made in decision block 111 to determine if the sprite is currently visible. Assuming that it is, the sprite will be lifted off the display by replacing the background at the current x,y position of the sprite, as indicated in function block 112. Once that is done, or if the sprite was not visible, a HIDE sprite command is saved for the sprite in function block 113 before the logic loops back to function block 105.

Figure 3:
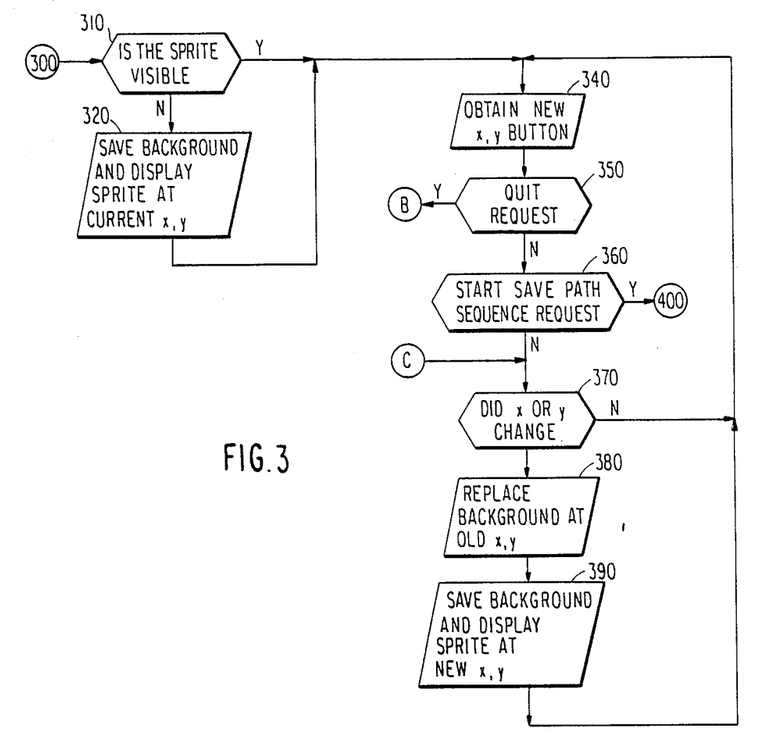
FIG. 3 is a flowchart of the move operation called from the sprite control program.

If the selected operation is the MOVE operation as detected at decision block 115, the flow of control passes to label 300 of FIG. 3. The MOVE operation is discussed in more detail below with reference to that figure.

If the selected operation is the SHOW operation as detected at decision block 120, a test is made in decision block 121 to determine if the sprite is visible. Assuming that it is not, the background is saved at the x,y coordinates of the sprite and the sprite is displayed at that location, as indicated in function block 122. When that is accomplished, or if the sprite is already visible, a SHOW sprite command is saved for the sprite in function block 123 before the logic loops back to function block 105.

If the selected operation is the PLACE operation as detected at decision block 125, then a the sprite is displayed at the current x,y location of the cursor, and the sprite image is saved as new background, as indicated in function block 126. This leaves a permanent copy of the sprite at the location. Next, a PLACE sprite command is saved for this sprite before control returns to function block 105 to select the next operation.

In decision block 130, as test is made to determine if the user wishes to select a different sprite. This may be in response to a prompt asking for an input by the user. If the user indicates that he or she desires to select a different sprite, control returns to function block 100 to allow that selection. Otherwise, control proceeds to decision block 135 where the user may select the operation of changing the transparent color of the sprite.

Assuming that the user selects the operation of changing the transparent color of the sprite in decision block 135, the system querys the user for the desired new transparent color in function block 136. The background of the current x,y location of the sprite is replaced in function block 137. The background is then saved and the sprite is displayed with the new transparent background color at the current x,y location in function block 138. Finally, a CHANGE TRANSPARENT COLOR command is saved for the sprite in function block 139 before control loops back to function block 105.

Figure 5:
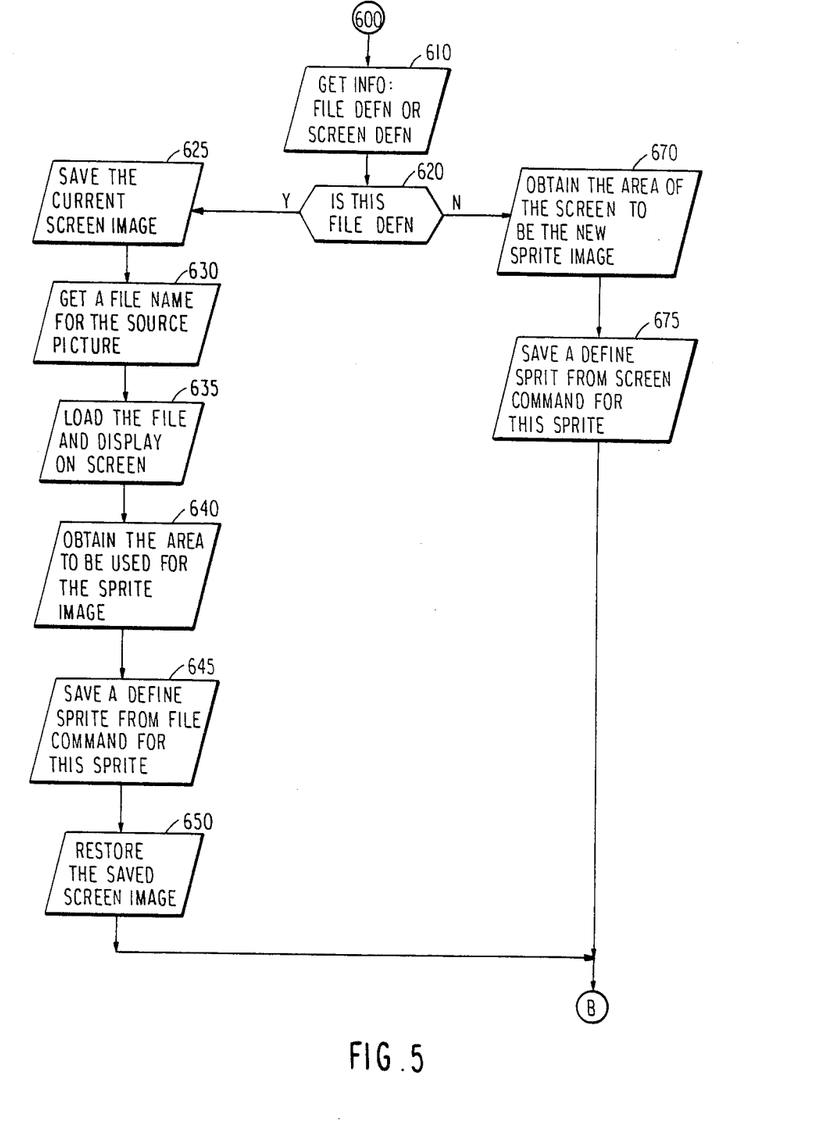
FIG. 5 is a flowchart of the sprite redefinition called from the sprite control program.

If the selected operation is the REDEFINE operation as detected at decision block 140, then control is passed to label 600 of FIG. 5. The REDEFINE operation will be described in more detail below with reference to that figure. Finally, the option to QUIT the main program is provided to the user in decision block 150. If the user chooses not to quit at this time, control loops back to function block 105 where the user is again prompted to select another operation. However, if the decision is to quit, then control is passed to label 715 of FIG. 6 to invoke the playback and edit functions of the program.

Turning now to FIG. 3, the MOVE operation will be described in detail. Beginning with the label 300 from decision block 115 of FIG. 2, a test is first made in decision block 310 to determine if the sprite to be moved is visible. If it is not, it is first necessary to save the background and display the sprite at the current x,y location of the cursor, as indicated in function block 320. Once the sprite is made visible, or if it is already visible, the new x,y location is obtained in function block 340. This is followed by a test in decision block 350 to determine if the user wishes to quit the request. This might be detected by the user pressing the Escape key or other designated function key, for example. If the user desires to quit, then control returns to the sprite control program at function block 105. Assuming, however, that no quit request is detected in decision block 350, then a test is made in decision block to determine if the user desires to start a save path sequence. Again, this would be by prompting the user to input his or her request. If a save path sequence is requested, control passes to label 400 in FIG. 4. This procedure will be described in more detail below with reference to that figure.

If a save path sequence has not been requested, a test is made in decision block 370 to determine if the x,y location of the sprite has changed. If not, control loops back to function block 340 to obtain the new x,y location. Assuming that the x,y location did change, then the background is replaced at the old x,y location in function block 380, and at the new x,y location, the background is saved and the sprite is displayed, as indicated in function block 390, before control loops back to function block 340.

Figure 4:
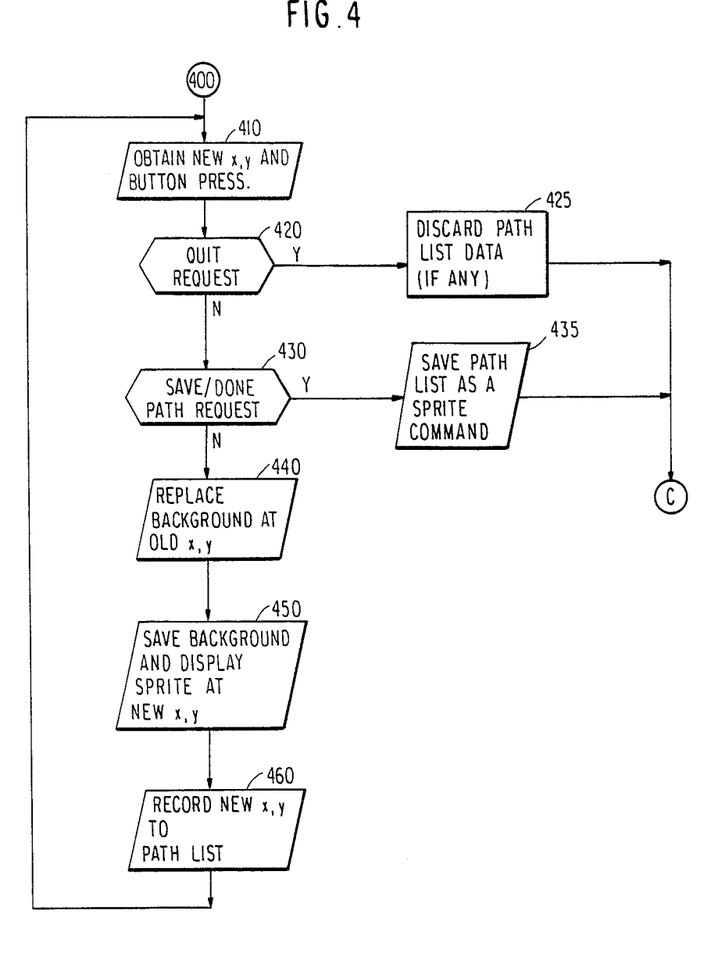
FIG. 4 is a flowchart of the get movement path operation called from the move operation flowchart of FIG. 3.

The SAVE PATH SEQUENCE commences at label 400 in FIG. 4. The new x,y location and the button press on the mouse are obtained in function block 410. A test is made in decision block 420 to determine if a quit request has been made by the user. Again, this would be detected by the user pressing the appropriate key. If a quit request is detected, any path list data is discarded in function block 425 before control reverts to decision block 370 in FIG. 3. Otherwise, a test is made in decision block 430 to determine if the user has made a SAVE or DONE PATH REQUEST. This is detected by the user pressing a designated function key on the keyboard. If such a request has been made, the path list is saved as a sprite command in function block 435 before control reverts to decision block 370 in FIG. 3.

If a SAVE or DONE PATH REQUEST has not been made by the user, the background is replaced at the old x,y location in function block 440, and in function block 450, the background is saved and the sprite is displayed at the new x,y location. Finally, the new x,y location of the sprite is recorded in the path list in function block 460 before the process loops back to function block 410.

Considering next the REDEFINE sprite operation which may be selected in decision block 140 in FIG. 2, this operation is entered at label 600 in FIG. 5. Sprite redefinition permits new images to be used for a sprite when the current image is no longer desired. The images may be accessed from the current display screen (created in the graphics artwork package) or from a file generated by the art package. The command created for defining a sprite from the screen will take whatever is on the screen in the specified position when the command is executed, while the define from file will access a specified position from the image file indicated. The file method permits a library of sprite images to be easily generated, used and distributed. The screen method permits the image to change depending on actions outside the animation editor, such as user actions in the presentation system.

Referring now to FIG. 5, first the file definition or the screen definition are obtained in function block 610. A test is then made in decision block 620 to determine which type of definition was obtained. If a file definition, the current screen image is saved in function block 625, and a file name for the source picture is obtained in function block 630. Then, in function block 635, the file is loaded and displayed. Next, the area to be used for the sprite image is obtained in function block 640, and a DEFINE sprite command from the file is saved for this sprite in function block 645. Finally, the saved screen is restored in function block 650 before control reverts back to function block 105 of FIG. 2.

If the test in decision block 620 determines that the information obtained is a screen definition, the area of the screen to be used for the new sprite image is obtained in function block 670. A DEFINE sprite command from the screen is saved for this sprite in function block 675, and control reverts to function block 105 of FIG. 2.

Figure 6:
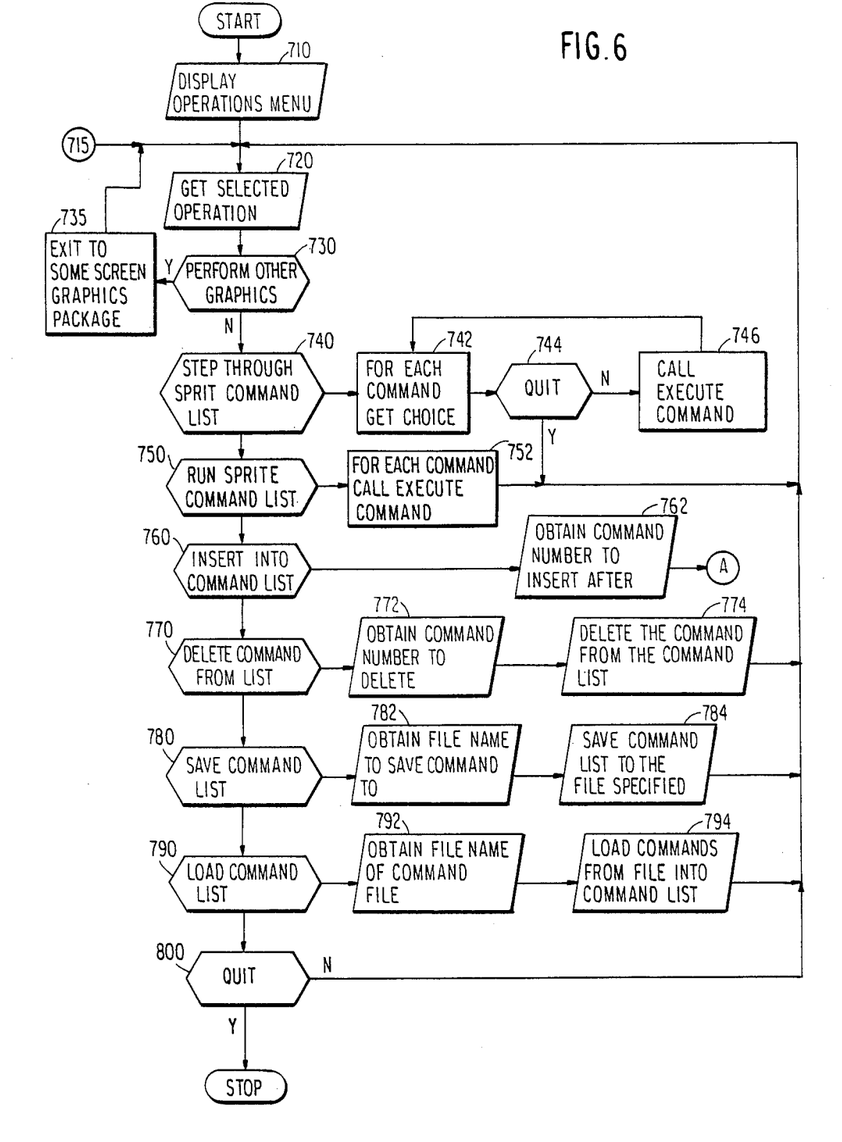
FIG. 6 is a flowchart of the playback and edit program according to the invention.

The playback and edit program is shown in the flowchart of FIG. 6. This program may be entered from the sprite control program shown in FIG. 2 to view and edit the sprite path definition generated by the user, or it may be started independently of the sprite control program. If started indepedently, the first thing that happens is that the operations menu is displayed in function block 710. This menu is not displayed if the playback and edit program is entered from the main program shown in FIG. 2 at label 715. The master program menu contains the following selections:

1. Perform graphics art: This selection permits the screen background to be changed for use behind the sprites, as well as creating picture files that may be used a sources for sprites.

2. Step through sprite command list: The step operations walks through the command list one item at a time, pausing between each, to permit the user to watch the animation carefully and correct any problems.

3. Run the sprite command list: The run selection will execute the command list at full speed as a later user would see the animation.

4. Insert into the sprite command list: This enables the user to add commands into the middle of the command list, or append to the end, as desired.

5. Delete a command from the command list: Any single command in the command list may be deleted.

6. Save the command list to a file: Saving the command list to a file permits the animation sequence to be stored for later editing, transferred to other users, and used in presentation systems with the EXECUTE command function.

7. Load a command list from a file: Loading commands from a file permits command lists to be joined into a single list and edited at times other than creation.

8. Quit: The quit selection provides an exit from the main menu.

Other editing functions, such move and copy, could be included in the menu selection, as will be apparent to those skilled in the art.

Referring now to FIG. 6, the selected operation is obtained in function block 720, and then a test is made in decision block 730 to determine if other graphics operations are to be performed. If so, the process is exited to another screen graphics package, not part of this invention. This screen graphics package could be any one of a number of commercially available graphics utilities such as, for example, the IBM Storyboard Plus for the IBM Personal System/2 (PS/2) computers. Once the other graphics operation is complete, control then loops back to function block 720.

There follows a series of decision blocks 740, 750, 760, 770, 780, 790, and 800 which present the user with several options which may be selected. If the option to step through the sprite command list is selected as detected by decision block 740, then for each command, the system prompts the user for a choice in function block 742. The user is given the option to quit in decision block 744 before the EXECUTE command is called in function block 746. The EXECUTE command function is described in more detail below with reference to FIG. 7. After that routine is performed, the process loops back to function block 742. Should the user elect to QUIT, the process loops back to function block 720.

Figure 7:
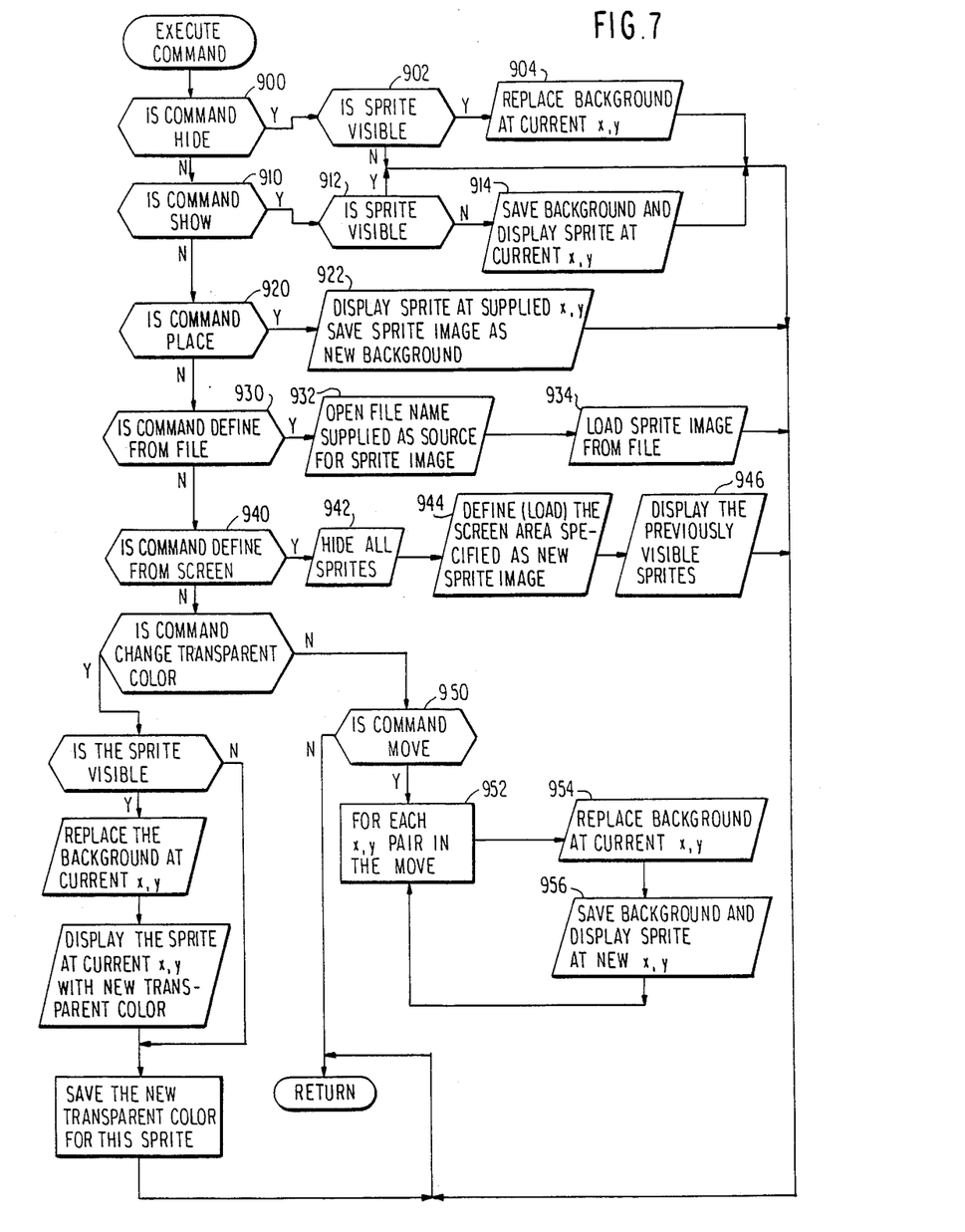
FIG. 7 is a flowchart of the execute command operation called from the playback and edit program.

If the user elects to run the sprite command list as detected in decision block 750, then for each command the EXECUTE command function is called in function block 752. Again, this routine is illustrated in FIG. 7.

If the user elects to perform an INSERT operation in the command list as detected in decision block 760, the command number after which the insert is to be made is obtained in function block 762. At this point, the main program shown in FIG. 2 would then be re-entered to perform the INSERT operation.

If the user elects to perform a DELETE operation in the command list as detected in decision block 770, the command number to be deleted is obtained in function block 772, and the command is deleted from the command list in function block 774. Control then reverts to function block 720.

If the user elects to perform a SAVE operation of the command list as detected in decision block 780, the file name for the commands to be saved is obtained in function block 782, and the command list is saved to that file in function block 784. Control then reverts to function block 720.

If the user elects to perform a LOAD operation of the command list as detected in decision block 790, the file name of the command file is obtained in function block 792, and the commands from the file are loaded into the command list in function block 794. Control then reverts to function block 720.

Finally, the user is given the option of quiting in decision block 800. If the user does not elect this option, control reverts back to function block 720. However, if the user elects to quit, the program stops at this point.

The command executer is a function that accepts a command as input and performs the operations on the sprite specified. It is modular and independent from the editor, so that it may be included in various presentation system implementations in the most efficient manner. The EXECUTE command function supports the following commands:

1. HIDE: Hide will hide the sprite if it is visible. This requires as data the sprite number to hide.
2. SHOW: Show will display the sprite if it is invisible. This requires as data the sprite number to show.
3. PLACE: Place will paste an image of the sprite to the screen that is non-removable. This requires as data the sprite number and x,y position on the screen at which to place the sprite.
4. DEFINE from FILE: This requires as data the sprite number to be defined, the file name, the x,y location in the file image and the size of the sprite.
5. DEFINE from SCREEN: This requires as data the sprite number to be defined, the x,y location of the screen image and the size of the sprite.
6. MOVE: Move will animate a sprite by displaying the sprite at a sequence of locations on the screen. This requires as data the sprite number to move and a stringe of x,y points at which to display the sprite.
7. CHANGE TRANSPARENT COLOR: The transparent color of the sprite may be changed to render special effects and to permit redefinition of the sprite to new images with differing colors. This requires as data the sprite number to effect and the color to be used as transparent for this sprite.

The EXECUTE command function flowchart is shown in FIG. 7. This function is called by function blocks 746 and 752 of FIG. 6. The first step of the process is to determine in decision block 900 whether the command is a HIDE command. If it is, a test is made in decision block 902 to determine if the sprite is visible. If it is, the background is replaced at the current x,y location in function block 904 before the process returns to the playback and edit program of FIG. 6. If the sprite is not visible, a return to the playback and edit program is made directly.

If the command is not a HIDE command, a test is made in decision block 910 to determine if the command is a SHOW command. If it is, a test is made in decision block 912 to determine if the sprite is visible. If it is not, the background is saved and the sprite is displayed at the current x,y location in function block 914 before a return is made to the playback and edit program. If the sprite is already visible, the return to the playback and edit program is made directly.

If the command is not a SHOW command, a test is made in decision block 920 to determine if the command is a PLACE command. If it is, the sprite is displayed at the supplied x,y location and the sprite image is saved as new background in function block 922. A return is then made to the playback and edit program.

If the command is not a PLACE command, a test is made in decision block 930 to determine if the command is a DEFINE from FILE command. If it is, a file is opened under the name supplied as the source for the sprite image in function block 932. The sprite image is loaded from the file in function block 934, and then a return is made to the playback and edit program.

If the command is not a DEFINE from FILE command, a test is made in decision block 940 to determine if the command is a DEFINE from SCREEN command. If it is, all sprites are hidden in function block 942. Then, the screen area specified as the new sprite image is defined in function block 944, and in function block 946, the previously visible sprites are displayed before a return is made to the playback and edit program.

If the command is not a DEFINE from SCREEN command, a test is made in decision block 947 to determine if the command is a CHANGE TRANSPARENT COLOR command. If not, the next test in decision block 950 is to determine if the command is a MOVE command. If it is a MOVE command, then for each x,y pair in the move, the background is replaced at the current x,y location, and at the new x,y location, the background is saved and the sprite is displayed as indicated by function blocks 952, 954 and 956. When that process is complete, a return is made to the playback and edit program.

Returning now to the test in decision block 947, if the command is a CHANGE TRANSPARENT COLOR command, the next test in decision block 960 is to determine if the sprite is visible. Assuming that it is, the background of the current x,y location is saved in function block 962, and in function block 964, the sprite is displayed at the current x,y location with the new transparent color. Once this procedure is complete, or if the sprite is not visible, the new transparent color for this sprite is saved in function block 966 before a return is made to the playback and edit program.

The flowcharts of FIGS. 2 to 7 provide a complete description of the logic of the program according to the invention. A programmer of ordinary skill in the art can easily write code in any desired programming language, such as BASIC, Pascal or C, from these flowcharts, and the invention is not limited to source code written in any particular language. The data required to implement the sprites consists of data specific to each sprite, and that shared by the sprites. Shared data is limited to an optional speed modifier that effects the speed of movement. This enhances the animation by permitting greater control of motion. Sprite specific data includes:

1. The current location of the sprite on the screen.
2. The size of the sprite (length and width).
3. Whether the sprite is currently visible or not.
4. The saved background image that replaces the sprite when it is invisible.
5. The sprite image that is placed on the screen.
6. The transparent color for the sprite that is invisible and permits the screen image to be seen through the sprite at all occurrences of this color.

A preferred environment for the invention is the IBM Learning System/1 Authoring and Presentation Systems. This commercially available software allows an author to create, using the authoring system, a series of screens, like pages in a book, that will be used to teach students. Each screen is created with attribute information such as color, length of display time, user prompts, inputs and branch information. The presentation part of the system is then used to present a coordinated display of a sequence of screens, depending on student input, without the overhead of the authoring system. The subject invention is an enhancement which can be used to manage graphics animations in the IBM Learning System/1. Those skilled in the art will recognize that the invention can be readily used in other environments with equal advantage.

While the invention has been described in terms of a preferred embodiment in a specific operating system environment, those skilled in the art will recognize that the invention can be practiced, with modification, in other and different operating systems within the spirit and scope of the appended claims.

Having thus described my invention, what I claim as new and desire to secure by Letters Patent is set forth in the following claims:

1. A method of interactively creating an animated display on a computer graphics screen comprising the steps of:
   selecting a graphics object from a display of graphics objects on said graphics screen or from a graphics object table stored in memory;
   moving said graphics object on said graphics screen by means of a pointing device;
   recording said movements of said graphics object on said graphics screen in memory;
   selecting an operation to perform on said graphics object at a particular location on said graphics screen;
   recording said operation on said graphics object and the location on the graphics screen where the operation is to be performed; and
   playing back said movement and said operation on said graphics object on said graphics screen at a later time.

2. A method of interactively creating an animated display as recited in claim 1 wherein said operation is a hide operation which hides the graphics object if it is currently visible.

3. A method of interactively creating an animated display as recited in claim 1 wherein said operation is a show operation which shows the graphics object if it is not currently visible.

4. A method of interactively creating an animated display as recited in claim 1 wherein said operation is a redefine operation which permits new images to be used for the graphics object.

5. A method of interactively creating an animated display as recited in claim 1 wherein said operation is a place operation which pastes an image of the graphics object to said graphics screen.

6. A method of interactively creating an animated display as recited in claim 1 wherein said recording steps produce a command list and said step of playing back is performed by stepping through said command list one item at a time in response to a user input to permit viewing of each stage of an animated display.

7. A method of interactively creating an animated display as recited in claim 6 further comprising the step of editing said recorded operation and movements.

8. A method of interactively creating an animated display as recited in claim 7 wherein in the step of editing includes the steps of:
   inserting commands into the middle or appending to the end of said command list;
   deleting a command from said command list; and
   saving the command list to a file.

9. A method of interactively creating an animated display as recited in claim 1 further comprising the step of using a mouse as the pointing device to move said graphics object on said graphics screen.

* * * * *